No. 760,879. PATENTED MAY 24, 1904.
C. H. KUNZMAN.
PLANT SUPPORT.
APPLICATION FILED NOV. 21, 1903.
NO MODEL.

Witnesses
Edwin G. McKee

Inventor
C. Harry Kunzman
By Victor J. Evans
Attorney

No. 760,879. Patented May 24, 1904.

UNITED STATES PATENT OFFICE.

C. HARRY KUNZMAN, OF LOUISVILLE, KENTUCKY.

PLANT-SUPPORT.

SPECIFICATION forming part of Letters Patent No. 760,879, dated May 24, 1904.

Application filed November 21, 1903. Serial No. 182,128. (No model.)

*To all whom it may concern:*

Be it known that I, C. HARRY KUNZMAN, a citizen of the United States, residing at Louisville, in the county of Jefferson and State of Kentucky, have invented new and useful Improvements in Plant-Supports, of which the following is a specification.

My invention relates to new and useful improvements in plant-supports; and its object is to provide a simple, durable, and inexpensive device which can be readily placed in position about a plant and support the same.

A further object is to provide a device of this character the rings of which can be folded upon each other, whereby the device can be conveniently hung or stored in a compact form.

With the above and other objects in view the invention consists in providing a support which is formed of similar parallel rings which are connected by standards which are loosely mounted on the rings and are adapted to be inserted into the ground at points adjacent a plant, so as to hold the rings in position thereabout.

The invention also consists in the novel construction and arrangement of parts, which will be more fully hereinafter described and claimed, and illustrated in the accompanying drawings, in which—

Figure 1:
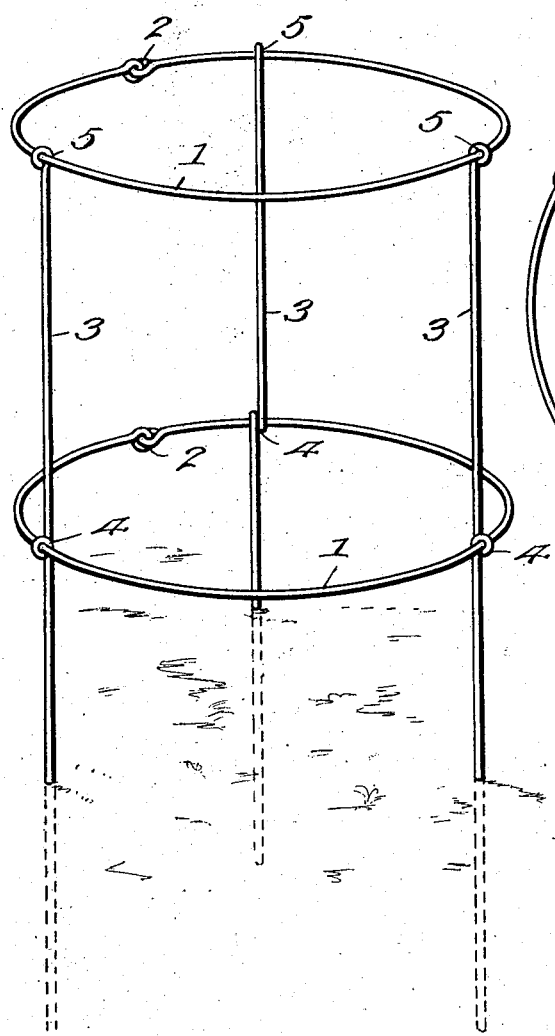
Figure 2:
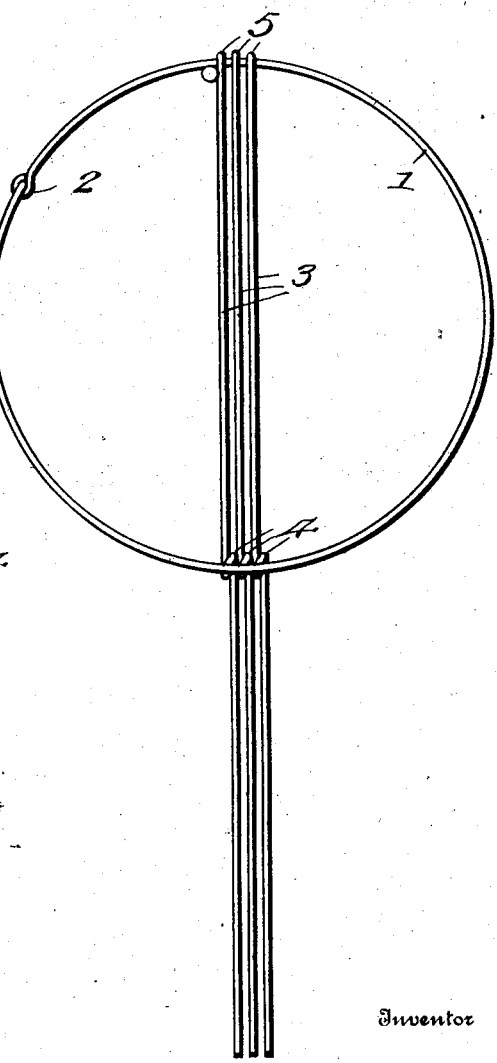

Figure 1 is a perspective view of my improved plant-support. Fig. 2 is a side elevation thereof, showing the same folded into position for storage.

Referring to the figures by numerals of reference, 1 1 are parallel rings of the same diameter and preferably formed of lengths of wire the ends of which are provided with interlocking eyes 2. Standards 3, formed of lengths of wire or other material, are loosely mounted upon these rings. Each standard is coiled at a point between its ends about the lower ring 1, as shown at 4, while its upper end is provided with an eye 5, which receives the upper ring 1. The distances between the coils 4 and the eyes 5 are preferably equal to the diameters of the rings 1. In using the device herein described the standards are preferably arranged at equal distances apart and the lower ends thereof are then inserted into the ground at opposite sides of the plant to be supported, thereby holding the rings in position around the plant. When the support is not in use, the standards 3 can be slid together and the rings folded over each other, as shown in Fig. 2, thereby forming a compact device which can be readily stored in a small space.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

In a device of the class set forth, the combination of standards having eyes at their upper terminals, coils at points intermediate to their ends and rings loosely inserted through the eyes and the coils and having their ends fixedly connected and inseparably secured, the standards being inseparably held by the rings and having the coils thereof spaced from the eyes a distance substantially equal to the diameters of the rings whereby the rings may be adjusted to an overlapping registering position with respect to each other without moving any portion thereof longitudinally of the standards.

In testimony whereof I affix my signature in presence of two witnesses.

C. HARRY KUNZMAN.

Witnesses:
P. A. REYNOLDS,
J. M. EBINGER.